March 31, 1925.

J. W. BURGESS 1,531,731

PREDETERMINED PRESSURE AND SIGNAL GAUGE

Filed May 11, 1922

INVENTOR
John W. Burgess
BY M. C. Frank
ATTORNEY

Patented Mar. 31, 1925.

1,531,731

UNITED STATES PATENT OFFICE.

JOHN W. BURGESS, OF OAKLAND, CALIFORNIA.

PREDETERMINED PRESSURE AND SIGNAL GAUGE.

Application filed May 11, 1922. Serial No. 560,088.

*To all whom it may concern:*

Be it known that I, JOHN W. BURGESS, a citizen of the United States, residing at 2327 19th Avenue, in the city of Oakland, county of Alameda, and State of California, have invented a new and useful Predetermined Pressure and Signal Gauge, of which the following is a specification.

This invention relates in general to predetermined pressure and signal gauges, and in particular to an instrument of this character, primarily for use in connection with the inflation of tires and other inflatable articles.

The principal object of my invention is, to produce as an article of manufacture, a simple, inexpensive, durable and self-contained combined valve and gauge, one that will permit the inflation of a tire or other container to a given pressure determined in advance and set to a visible graduated scale, such that when the set pressure is reached two signals will be given, an audible one and one sensed by feeling by the escapement of air into the palm of the hand.

A further object of importance is, the protection of the indicator and control means therefor by a guard, the latter being a part of the handle for handling the device.

Another object is, that the invention shall include a one-piece cylindrical body portion adapted to envelop the mechanism thereof, and protect the same when in use, and when handled carelessly, or thrown down after the inflation of a container is completed.

And a still further object that I attain is by the efficient design of the head of my instrument, taking up a minimum of space, thus allowing the head to be easily slipped over the tire valve protruding from the felly of a wheel that in many instances cannot be done except with a small-headed special air valve.

The instrument by which the above and other objects are accomplished, and the manner of its operation, will be fully set forth in the subjoined description of the accompanying sheet of drawings in which I have illustrated an apparatus containing my invention, and in which.

Figure 1:
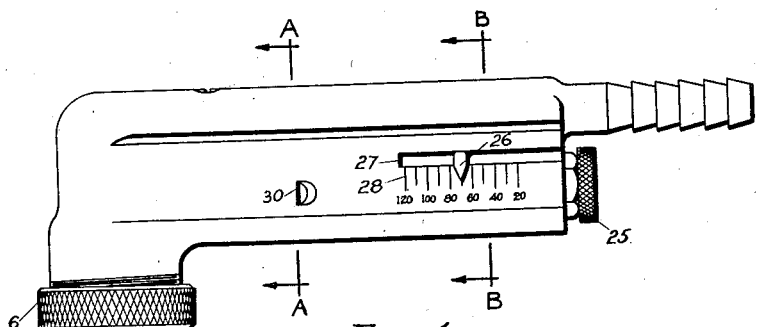
Figure 1 is a longitudinal elevation of the instrument.

For convenience I will describe the instrument as used in the inflation of automobile tires.

The end 1 of the instrument may be corrugated or otherwise formed for connection to an air hose, or it may be provided with a union coupling member for engaging the matching member on a hose. The barrel 2 is provided with a bore 3, extending from the end 1 to a chamber 4 at the opposite end of the barrel, and which chamber terminates in a larger chamber 5, the same being closed by a cap 6, with a suitable rubber packing ring 7 for engaging the valve stem 8 of a tire.

Figure 2:
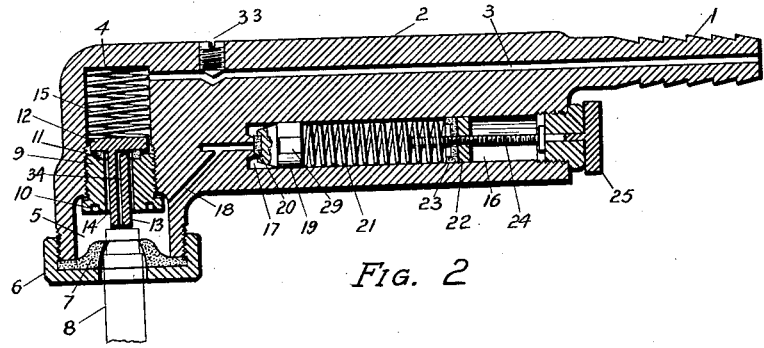
Figure 2 is a longitudinal cross-section of the same, some of the minor parts being shown in full, also the valve of a tire.

The two chambers are separated by a threaded plug 9, screwed to position by inserting a spanner in holes 10 provided for that purpose. The face of the plug is preferably recessed for the reception of a packing ring 11. On this ring is seated a valve 12, provided with a stem 13 extending into and through the hole 14 in the plug 9. The stem 13 is smaller in diameter than the hole 14 as shown in Figure 2, to permit the passage of air from chamber 4 to chamber 5, when valve 12 is opened, for a purpose to be described hereinafter. A compression spring 15 holds the valve 12 normally closed, whatever the position of the instrument.

Under the bore 3, in barrel 2, is a larger bore 16, which has preferably a raised valve seat 17 at its inner end, and which bore communicates with chamber 5 by a smaller bore 18. The latter bore is closed by a valve 19, having a suitable packing 20 if desired. Valve 19 is pressed to its seat by a spring 21. The other end of the spring bears against an interior threaded plunger 22, preceded by a leather washer 23 if desired. The plunger is under control of a screw 24 turned by a milled head 25. Thus, by turning the milled head, the plunger may be moved back or forth to regulate the spring compression to any desired degree, this regulating the pressure at which the valve 19 will open. A pointer 26, connected to plunger 22, may extend through a slot 27, and show on a scale 28, the indicated pressure at which the air in chamber 5 will react, this being the pressure in the tire when inflated.

Valve 19 may be flattened on one side as at 29, to permit air to pass it as soon as it leaves its seat. This occurs only when the air pressure in the tire has reached the point predetermined as set by the pointer. The air passing through the space left by flattening the valve 19, exits through a small orifice 30 and through the inner end of the slot 27. The air from the latter impinges on the palm of the hand of the user grasping the barrel 2, and gives him notice that the desired pressure has been reached. The hole 30 is cut at an angle forming a whistle-notch, and the air striking its sharp edge gives a whistling sound as an additional notice to the user that the predetermined pressure has been reached. Thus, for persons hard of hearing or deaf, the former notice sensed by feeling, would be of advantage to them, while to other persons the double signal would be a check, one to the other.

Figure 3:
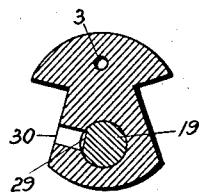
Figure 3 is a vertical cross-section taken at the line A—A, of Figure 1 and looking in the direction of the arrows.
Figure 4:
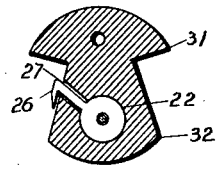
Figure 4 is a similar section taken at the line B—B of Figure 1 and looking in the same direction.

As seen more particularly in Figures 3 and 4, the top of the barrel 2 appears to be flanged outward as at 31, and the same is true of the lower side of the barrel as at 32, resulting from the cylindrical barrel 2 having segments or longitudinal angular grooves cut therefrom. The purpose of this construction is, that the instrument may rest on those portions when thrown down, as is commonly done by users thereof, and so protect the pointer 26 and other exposed parts from injury.

In operation, when it is desired to inflate the tire, the instrument is slipped over the tire valve 8, the rubber ring 7 sealing the chamber 5 with respect to the latter valve as shown in Figure 2. The valve stem 13 then engages the tire valve and is pressed thereon sufficiently to overcome the resistance of valve 12, which then opens and admits the air from the air hose through the bore 3, past the throttling screw 33 into chamber 4, thence through the right-angle bore 34 in stem 13 and into the tire. At the same time chamber 5 is filled with air under pressure through hole 14 and when the desired set pressure is attained in the tire, the releasing or safety valve 19, then functions, and the inflation is completed.

In the drawings I have shown but one specific form of my invention, and it is to be understood that the invention may be embodied in many different forms, each being a species of my invention, and the patent protection that I desire is, all of that which comes within the spirit and scope of what I claim as new, and which claim is as follows:

A pressure device comprising a block having a hand-grip portion terminating in a downwardly presented valve stem engaging end, said hand-grip portion being formed substantially T-shaped in cross-section to present overhanging flanges and an outwardly flaring base, a bore in the hand-grip portion terminating at one end in a connection for an air supply and at its opposite end in a relatively large chamber formed in the valve stem engaging end, valve mechanism in said chamber to control the introduction of air to the valve stem, a relatively large bore in the hand-grip portion below and parallel to the first-named bore, a communication between said large bore and said chamber in the valve stem engaging end, a valve in said large bore for controlling the introduction of air through said communication and a plunger and compression spring also in said large bore, the spring being interposed between said valve and plunger, an air outlet in said bore, and a pressure indicator connected to said plunger and movable in a slot communicating with said large bore whereby the indicator may be set at a chosen indicated pressure for governing the operation of said valve against said spring to permit the discharge of the excess air through said outlet as a signal to the operator handling the device, the said overhanging flanges protecting the said indicator in usage.

JOHN W. BURGESS.